United States Patent [19]

Meier et al.

[11] Patent Number: 5,337,185

[45] Date of Patent: Aug. 9, 1994

[54] THREE DIMENSIONAL DIFFRACTION GRATING AND CRYSTAL FILTER

[75] Inventors: Joseph F. Meier, Export; Nathan T. Melamed, Pittsburgh, both of Pa.

[73] Assignee: Westinghouse Electric Corp., Pittsburgh, Pa.

[21] Appl. No.: 945,754

[22] Filed: Sep. 16, 1992

[51] Int. Cl.$^5$ .......................... G02F 1/00; G02B 1/00; G02B 5/22

[52] U.S. Cl. .................................. 359/321; 359/296; 359/576; 359/885; 359/900; 252/582

[58] Field of Search ............... 359/296, 321, 569, 576, 359/886, 885, 900

[56] References Cited

U.S. PATENT DOCUMENTS

| | | | |
|---|---|---|---|
| 4,627,689 | 12/1986 | Asher | 359/296 |
| 4,632,517 | 12/1986 | Asher | 359/293 |
| 5,131,736 | 7/1992 | Alvarez | 359/886 |

OTHER PUBLICATIONS

Campos-Lopez et al, "Thermodynamic and Structural Properties of Polystyrene-Poly. Butadiene-Polystyrene Block Copolymers", Macromolecules, vol. 6, No. 3 (1973), pp. 515-423.
Asher, Flaugh, and Washinger, "Crystalline Colloidal Bragg Diffraction Devices: the Basis For a New Generation of Raman Instrumentation", Spectroscopy, vol. 1, No. 12, 26-31.
Rundquist, Photinos, Jagannathan, and Asher, "Dynamical Bragg diffraction from crystalline colloidal arrays", J. Chem. Phys., vol. 91, pp. 4932-4941 (1989).
Kesavamoorthy, Jagannathan, Rundquist, and Asher, "Colloidal Crystal Photothermal Dynamics", J. Chem. Phys. vol. 94, pp. 5172-5179 (1977).
Rundquist, Kesavamoorthy, Brnardic, Xu, Asher, "Photothermal Compression of Colloidal Crystals", J. Chem. Phys., vol. 94, pp. 711-717 (1991).
Rundquist, Kesavamoorthy, Jagannathan and Asher, "Thermal Diffuse, Scattering From Colloidal Crystals", J. Chem. Phys., vol. 95, pp. 1249-1257 (1991).

*Primary Examiner*—Loha Ben
*Assistant Examiner*—Darryl J. Collins

[57] ABSTRACT

A rigid three dimensional diffraction grating is provided in the form of an ABA block copolymer that forms domains. The A domain of the block copolymer is preferably polystyrene and the B domain of the copolymer is preferably a diene such as polybutadiene or polyisoprene. The molecular weight of the diene can be synthetically controlled to regulate the interelement spacing of the polystyrene domains and control the diffraction obtained from the grating.

10 Claims, No Drawings

THREE DIMENSIONAL DIFFRACTION GRATING AND CRYSTAL FILTER

BACKGROUND OF THE INVENTION

1. Field Of The Invention

This invention relates to the field of diffraction gratings and optical filters and, more particularly, to rigid three dimensional diffraction gratings and optical filters used as laser protection devices.

2. Description Of Related Art

Plane diffraction gratings are commonly used as narrow bandpass filters or as rejection filters. As a narrow bandpass filter, the diffraction grating disperses the light into its component wavelengths. A suitable slit or aperture permits light within a narrow wavelength band to pass through the grating and to reject, light outside that band. As a rejection filter, a stop placed at an appropriate position in the output of the diffraction grating blocks light having a defined wavelength from passing therethrough and permits light outside that wavelength to pass through. As a rejection filter, the diffraction grating can be used as a protective screen against laser light of a known frequency. More generally, however, a diffraction grating serves as a protective screen from laser light when it functions as a narrow bandpass filter.

A much narrower bandpass filter, which can provide a much greater level of rejection, can be obtained by utilizing Bragg diffraction in a three dimensional grating, equivalent to Bragg diffraction in a crystal. Such a pseudo-crystal consists of a three-dimensional array of equally spaced scattering centers. The Bragg equation governing diffraction in a three-dimensional medium is: $n\lambda = 2d \sin \theta$, where n is a positive or negative integer indicating the diffraction order;

$\lambda$ is the wavelength of the incident light;

$\theta$ is the angle of incidence of the radiation relative to the direction of the incident beam; and d is the distance between scattering centers, equivalent to the interatomic spacing in a crystal.

By suitably choosing the values of d and $\theta$, the filter can be tuned to any desired wavelength, $\lambda$. In this way, a narrow band filter can be made to function as either a bandpass filter or as a rejection filter at a preset wavelength. For a fixed value of d, the wavelength can be changed by changing $\theta$, i.e. by rotating the three-dimensional grating to change the angle of incidence of the grating with respect to the incident beam.

Aqueous-based three dimensional gratings have been developed which provide much higher rejection and much higher resolution than the rigid one dimensional gratings. Such three dimensional aqueous diffraction gratings are disclosed in S. A. Asher and P. L. Flaugh, "Crystalline Colloidal Bragg Diffraction Devices: The Basis Of A New Generation Of Raman Instrumentation", *Spectroscopy*, Vol. 1, No. 12, pp. 26–31 (1986) and by Asher in U.S. Pat. Nos. 4,627,689 and 4,632,517. These gratings consist of a colloidal dispersion of charged polystyrene spheres in a liquid. An electrostatic charge on each of the spheres produces mutual repulsion, causing the spheres to arrange themselves into a lattice of equally spaced scattering centers. The inter-scatter distance can be changed by adjusting the number density of spheres in the liquid so as to permit Bragg diffraction in the visible region of the spectrum. The array of the polystyrene spheres in water forms a hexagonal closed packed crystal structure.

By using an aqueous-based three dimensional grating, a narrow band filter with a bandpass about 40Å wide and an out-of-band rejection ratio about 99.99% has been produced. Such an aqueous-based grating is usually held between transparent plates of glass or quartz. Because the three dimensional grating is aqueous based, the use of a container for the grating is an absolute requirement. In addition to such awkwardness in use, the aqueous based three dimensional gratings are also limited by their inability to conform to irregularly shaped surfaces, are subject to mechanical instabilities in the presence of vibrations, and are awkward to use and to handle.

The three-dimensional pseudo-crystal suffers in that the grating is in the form of a liquid, and is therefore subject to instabilities produced by vibration, turbulence, thermal gradients, and the like. For ease of application and use, it is desirable that the three dimensional diffraction grating be rigid. A rigid grating can be used with most any surface and in most any orientation. Until now, such rigid diffraction gratings have been one dimensional, consisting of etched lines on a coated medium. Such one dimensional gratings provide only limited resolution and rejection properties. Thus, there is a need for a diffraction grating that combines the ease of use of one dimensional rigid gratings yet obtains the rejection and resolution performance of a three dimensional grating.

SUMMARY OF THE INVENTION

A rigid three dimensional diffraction grating and crystal filter for separating a narrow wavelength band from a broader spectrum of electromagnetic radiation is provided in which ABA block copolymers (also known as SBS block copolymers) are used. In a preferred form of such a block copolymer, A represents polystyrene domains and B represents segments formed from a diene such as polyisoprene or polybutadiene. However, other materials can be used to prepare the ABA block copolymer.

The ABA block copolymers of the present invention may be prepared by anionic polymerization techniques. The block copolymers formed from such techniques have essentially monodisperse block segments. In such block segments, domains of nearly pure polystyrene entanglements are segregated by nearly pure polydiene polymer. The resulting block copolymer is a rigid three dimensional structure that achieves the flexibility of use of a rigid diffraction grating and the resolution and rejection performance of a three dimensional grating. By directing a broader spectrum of electromagnetic radiation onto the ABA block copolymer at an angle of incidence, a narrow wavelength band is Bragg diffracted out of the broad spectrum of electromagnetic radiation.

DETAILED DESCRIPTION OF THE PREFERRED EMBODIMENTS

A three dimensional rigid grating for separating a narrow wavelength band from a broader spectrum of electromagnetic radiation is provided which obtains much higher rejection and much higher resolution than a one dimensional rigid grating. As a rigid three dimensional grating, the present diffraction grating displays all of the advantages of a three dimensional grating while avoiding the inherent disadvantage of being a liquid. The present rigid three dimensional diffraction grating can be fabricated into arbitrary shapes and does not need a container in order to be used. Accordingly, such a rigid three dimensional diffraction grating can be used in connection with aircraft windows having complex or compound curvature.

The three dimensional rigid grating of the present invention is an ABA block copolymer that forms domains. The ABA block copolymers of the present invention invention may be prepared by anionic polymerization techniques. One example of such a block copolymer is supplied commercially under the trade name Kraton sold by Shell Chemical Company. Such block copolymers have essentially monodisperse block segments. In other words, the ratio of the weight average molecular weight to the number average molecular weight ($M_w/M_n$) is approximately equal to 1. The chemistry of the polymerization process used to form the ABA block copolymers is well known and is discussed in E. Campos-Lopez, D. Mc Intyre, L. J. Fetters, "Thermodynamic and Structural Properties of Polystyrene-Polybutadiene-Polystyrene Block Copolymers", *Macromolecules*, 6(3), pp. 415–23 (1973). The molecular weight of the block segments controls the domain size. By varying the molecular weight of the block segments, various polystyrene domain structures can be obtained. In such structures, the domains are entanglements of nearly pure polystyrene segregated by nearly pure polydiene polymer. The separation of the polystyrene and polydiene polymer occurs because the diene and styrene segments are thermodynamically incompatible.

The polystyrene domain radius and its separation distance is controlled by the diene blocks in the ABA block copolymer. Tables I and II below are derived from Table I and Table IV of Campos-Lopez et al., respectively.

TABLE I

| Molecular Weights And Composition Of ABA Block Copolymers | | | |
|---|---|---|---|
| Sample | $M_s \times 10^{-3}$ g/mol | $M_n \times 10^{-3}$ g/mol | Wt % Polystyrene | Vol % Polystyrene |
| 1 | 7.0–35.0–7.0 | 49.0 (±3%) | 28.5 | 24.6 |
| 2 | 13.7–63.4–13.7 | 94 (±3%) | 30.0 | 26.6 |
| 3 | 21.1–97.9–21.2 | 142 (±5%) | 30.0 | 26.6 |
| 4 | 120–660–120 | 900 (±10%) | 27.0 | 23.5 |

TABLE II

| Lattice And Molecular Parameters Of ABA Block Copolymers | | | | | |
|---|---|---|---|---|---|
| Sample | Domain Radius (A) | Polystyrene $(R_o^2)_\theta^{\frac{1}{2}}$ | Ratio | Polybutadiene $(R_o^2)_\theta$ | Distance | Ratio |
| 1 | 93 | 57 | 0.61 | 164 | 133 | 1.23 |
| 2 | 116 | 79 | 0.68 | 225 | 215 | 1.05 |
| 3 | 170 | 98 | 0.58 | 286 | 295 | 0.97 |
| 4 | 207 | 230 | 1.11 | 716 | 233 | 3.08 |

In Table I, $M_s$ is the stoichiometric molecular weight of the ABA block copolymer segments as determined from the ratio of monomer to sec-butyllithium initiator. In Table II, $(R_o^2)_\theta^{\frac{1}{2}}$ polystyrene chain estimated from the $\theta$ directions and $(R_o^2)_\theta$ is the unperturbed butadiene end-to-end length.

The data in Tables I and II above shows that the domain radius and separation distance of the polystyrene segments can be effectively controlled by varying the diene block. Consequently, very precise ABA block copolymers can be produced.

By utilizing synthetic routes in the production of the copolymer, the size of the blocks can be accurately controlled. By varying the size of block copolymer, the interplanar interelement spacing of the polystyrene blocks can be accurately maintained. This allows the synthetic production of ABA block copolymer compositions specific for various wavelength regions.

Diffraction by a regular array of equally spaced elements is governed by Bragg's law:

$$n\lambda = 2d \sin\theta$$

For a fixed incident wavelength, diffracted light is seen at different angles corresponding to different diffraction orders. The lowest order is n=1, where equation (1) reduces to $\lambda = 2d \sin\theta$.

EXAMPLE

In order to determine the feasibility of the present invention, a glass microscope slide was coated with a solution of an ABA block polymer of polystyrene-polybutadiene-polystyrene and air dried to give a thin polymer film. A well collimated beam from a He/Ne laser was shined or directed incident on the slide normal to the beam. A detector assembly consisting of a collimating lens, a slit, and a photomultiplier was mounted on a goniometer arm so that it could be rotated about the point where the laser beam intercepted the polymer coating. The angles of diffraction of the incident beam were then measured.

In measuring the angles of diffraction, it was necessary to extend the measurement beyond the first order diffractions. Because the first order of diffraction is so close to the zero order, where the intensity of the incident to beam is very strong, measurements are difficult to take. Because it is easier to obtain measurements at higher orders, the difference between adjacent orders $\Delta n = n - (n-1)$ yields the same value as n=1. By utilizing this relationship, the resultant angle $\theta$ between adjacent orders and the value $\sin\theta$ can be obtained. Thereafter, the value of d, the interelement spacing that is producing the diffraction, can be calculated. This method makes it unnecessary to actually know the absolute value of n. However, it is best to take measurements at a number of adjacent diffraction peaks and use the average to compute d.

Table III below shows the measured angles, and computed values of d. Only the strongest lines were tabulated. The results of the experiment, indicate that diffraction seems to occur in pairs. Thus, there is an ambiguity in the value of d. It is possible that the ABA block copolymers produce a grating that has 2 sets of spacings, corresponding to two different geometric entities.

TABLE III

| Strong Diffraction Peaks | | | | |
|---|---|---|---|---|
| $\theta$, deg, min | $\Delta\theta$ | $\sin \Delta\theta$ | $\Delta\theta'$ | $\sin \Delta\theta'$ |
| 5° 0'  <br> 5° 16' | 16' | 0.00465 | | |
| | | | 1° 25' | 0.0247 |
| 6° 19'  <br> 6° 46' | 27' | 0.00785 | | |
| | | | 1° 3' | 0.0183 |
| 7° 23'  <br> 7° 49' | 26' | 0.00756 | | |

TABLE III-continued

| | Strong Diffraction Peaks | | | |
|---|---|---|---|---|
| θ, deg, min | Δθ | sin Δθ | Δθ' | sin Δθ' |
| Δθ av | 23' | 0.00669 | 1° 14' | 0.0215 |

$d = 3.05 \times 10^{-6}$ cm $= 30.5$ Å
$d = 1.83 \times 10^{-6}$ cm $= 18.3$ Å

Uses for the presently disclosed three dimension diffraction grating include applications where very sharp rejection filters are needed, as for laser protection devices. In addition, the ABA block copolymer can be used as a narrow bandpass filter. Moreover, because of the accuracy and high resolution of the grating, the grating can be used for laser tuning and wavelength identification.

The ABA block copolymer of the present invention is a rigid three dimensional system which can be applied to any surface. The block copolymer can be sprayed on a surface in connection with an organic solvent that is allowed to evaporate leaving behind a thin film of the copolymer. In addition, the ABA block copolymer can be formed as a bonded sheet. Finally, the block copolymer can be applied to a surface by means of solvent dipping or as a hot melt. Spraying or dip coating appear to be the easiest methods of application.

In the foregoing specification certain preferred practices and embodiments of this invention have been set out, however, it will be understood that the invention may be otherwise embodied within the scope of the following claims.

We claim:

1. A rigid diffraction optical filter for separating a narrow wavelength band from a broader spectrum of electromagnetic radiation comprising an ABA block copolymer that forms domains, wherein the A domain is polystyrene and the B domain is selected from the group of dienes, wherein the molecular weight of the diene is synthetically controlled to regulate the interelement spacing between polystyrene and domain structure of said filter, thereby regulating the diffraction.

2. A method for making a diffraction grating for separating a narrow wavelength band from a broader spectrum of electromagnetic radiation comprising the steps of:
   a. forming an ABA block copolymer that forms domains, by introducing polystyrene domains into a matrix formed from domains selected from the group of dienes; and
   b. applying said block copolymer to a surface.

3. The method of claim 2 further comprising the step of regulating the molecular weight of said diene to produce a desired interelement spacing between the polystyrene domains.

4. The method of claim 3 wherein said diffraction grating is applied to a surface by dipping.

5. The method of claim 3 wherein said ABA block copolymer is mixed:with an organic solvent and said mixture is applied to a surface by spraying the mixture, said organic solvent evaporating to leave a rigid three dimensional diffraction grating.

6. The method of claim 3 wherein said diffraction grating is applied to a surface by electrostatic spraying.

7. The method of claim 3 wherein said diffraction grating is formed as a bonded sheet.

8. The method of claim 3 wherein said diffraction grating is formed as a hot melt.

9. A method of filtering a narrow wavelength band from a broader spectrum of electromagnetic radiation comprising the steps of:
   a. forming an ABA block copolymer that forms domains, by introducing polystyrene domains into a matrix formed from domains selected from the group of dienes; and
   b. directing said broader spectrum of electromagnetic radiation onto said ABA block copolymer at an angle of incidence, whereby said wavelength band is Bragg diffracted out of said broader spectrum of electromagnetic radiation.

10. The method of claim 9 further comprising the step of regulating the molecular weight of said domains selected from the group of dienes to produce a desired interelement spacing between said polystyrene domains.

* * * * *